United States Patent
Joukov et al.

(10) Patent No.: US 8,583,709 B2
(45) Date of Patent: Nov. 12, 2013

(54) DETAILED INVENTORY DISCOVERY ON DORMANT SYSTEMS

(75) Inventors: Nikolai A. Joukov, Thornwood, NY (US); Birgit Pfitzmann, Valhalla, NY (US); Shaya Potter, New York, NY (US); Harigovind V. Ramasamy, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 12/726,857

(22) Filed: Mar. 18, 2010

(65) Prior Publication Data

US 2011/0231455 A1 Sep. 22, 2011

(51) Int. Cl.
*G06F 17/30* (2006.01)

(52) U.S. Cl.
USPC ........................................... 707/822

(58) Field of Classification Search
USPC .................................. 707/758, 822
See application file for complete search history.

(56) References Cited

U.S. PATENT DOCUMENTS

2009/0222461 A1* 9/2009 Alpern et al. ................. 707/100

OTHER PUBLICATIONS

Reimer et al., Opening Black Boxes: Using Sematic Information to Combat Virtual Machine Image Sprawl, VEE '8 Mar. 5-7, 2008, pp. 111-120.*
U.S. Appl. No. 12/702,820, filed Feb. 9, 2010, titled Middleware-Driven Server Discovery.
Bowker et al., ESG Lab Validation Report, EMC Smarts Application Discovery Manager, Automated Infrastructure Discovery, Jul. 2007, pp. 1-14.
Chen et al., Automating Network Application Dependency Discovery: Experiences, Limitations, and New Solutions, OSDI 200.
Fyodor, The Art of Port Scanning, Phrack Magazine, Sep. 1, 1997, vol. 7, Issue 51, article 11 of 17.
Joukov, N. et al., Built-to-Order Service Engineering for Enterprise IT Discovery, Proceedings of the IEEE International Conference on Services Computing (SCC 2008) Jul. 2008, pp. 91-98, vol. 2.
Kumar, A Message from Data Center Managers to CIOs: Floor Space, Power and Cooling will Limit Our Growth, Gartner RAS Core Research note G00142393, Aug. 21, 2006, R1617 03302007.
Rich, Taddm's Flexible Approach to Discovery, The Tivoli Advisor, Technical Report, Oct. 2007, 12.
U.S. Appl. No. 12/485,345, filed Jun. 16, 2009, titled Process and System for Comprehensive IT Discovery Without Credentials.
Kashima et al., Network-based Problem Detection for Distributed Systems, Proceedings of the 21st International Conference on Data Engineering (ICDE 2005), Apr. 2005, pp. 978-979.
Bem et al., Analysis of USB Flash Drives in a Virtual Environment, Small Scale Digital Device Forensics Journal, vol. 1, No. 1, Jun. 2007, pp. 1-6.

(Continued)

*Primary Examiner* — Rehana Perveen
*Assistant Examiner* — Alexander Khong
(74) *Attorney, Agent, or Firm* — Louis J. Percello; Ryan, Mason & Lewis, LLP

(57) ABSTRACT

A file system interface is simulated out of at least a portion of a dormant computer system. File-based discovery is performed on the simulated file system interface to obtain a detailed inventory of at least the portion of the dormant computer system. The detailed inventory includes one or more of software profiles of at least the portion of the dormant computer system, software instances of at least the portion of the dormant computer system, services of at least the portion of the dormant computer system, and data objects used by the services.

21 Claims, 4 Drawing Sheets

(56) References Cited

OTHER PUBLICATIONS

Dunlap et al., ReVirt: Enabling Intrusion Analysis through Virtual-Machine Logging and Replay, Proceedings of the 2002 Symposium on Operating Systems Design and Implementation (OSDI), pp. 1-14.

Reimer et al., Opening Black Boxes: Using Semantic Information to Combat Virtual Machine Image Sprawl, VEE '08 Mar. 5-7, 2008, pp. 1-10.

Shavers, A Discussion of Virtual Machines Related to Forensics Analysis, Virtual Forensics 2008, pp. 1-35.

VMware Disk Mount User's Guide, Virtual Disk Development Kit, pp. 1-12, 2008.

Yu et al., A Kernel based Structure Matching for Web Services Search, WWW 2007, ACM 978-1-59593-654-07/07/0005, pp. 1249-1250.

HP Discovery and Dependency Mapping (DDM) Inventory Software, pp. 1-4, 2007.

Litty et al., "Hypervisor Support for Identifying Covertly Executing Binaries," Jul. 28, 2008, pp. 1-16.

Tivoli Application Dependency Discovery Manager, http://www-01.ibm.com/software/tivoli/products/taddm/, Jul. 13, 2010, pp, 1-2.

About—QEMU, http://wiki.gemu.org/Main_Page, Jul. 13, 2010, pp. 1-2.

Tivoli Provisioning Manager Information Center, http://publib.boulder.ibm.com/infocenter/tivihelp/v11r1/topic/com.ibm.tivoli.tpm.doc, Jul. 13, 2010.

Wang et al., "Semantic Structure Matching for Assessing Web-Service Similarity," Abstract, 2003.

* cited by examiner

DETAILED INVENTORY DISCOVERY ON DORMANT SYSTEMS

FIELD OF THE INVENTION

The present invention relates to the electrical, electronic and computer arts, and, more particularly, to information technology (IT) management and the like.

BACKGROUND OF THE INVENTION

There are many IT optimization and management situations in which it is desirable or even necessary to obtain detailed inventory and dependency information from dormant computer systems. Current solutions only allow for obtaining superficial inventory from dormant computer systems, or detailed inventory from actively running computer systems, but not detailed inventory from dormant computer systems.

In science, the word 'dormant' is used to mean "latent but capable of being activated." Similarly, in the context of this application, the term 'dormant computer system' is used to mean "a collection of computer files that by themselves aren't an active running computer system but can form the basis of one." Examples of dormant systems include virtual machine images (which can be directly used by a hypervisor to instantiate virtual machines), computer disk partitions, and ISO images (an ISO image is an archive file (also known as a disc image) of an optical disc in a format defined by the International Organization for Standardization (ISO)) stored on a compact disk (CD).

Analysis and forensics capabilities on dormant systems are available from, for example, Brett Shavers, "Virtual Forensics: A Discussion of Virtual Machines Related to Forensics Analysis," and D. Bem et al., "Analysis of USB Flash Drives in a Virtual Environment," Small Scale Digital Device Forensics Journal, 1(1), June 2007. The utility of these techniques is generally limited to examining the files on those systems.

SUMMARY OF THE INVENTION

Principles of the invention provide techniques for detailed inventory discovery on dormant systems. In one aspect, an exemplary method includes the step of simulating a file system interface out of at least a portion of a dormant computer system. The method further includes performing file-based discovery on the simulated file system interface to obtain a detailed inventory of at least the portion of the dormant computer system. The detailed inventory includes one or more of software profiles of at least the portion of the dormant computer system, software instances of at least the portion of the dormant computer system, services of at least the portion of the dormant computer system, and data objects used by the services.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

One or more embodiments of the invention may offer one or more of the following technical benefits:

Provides automated, detailed inventory and dependency analysis capabilities directly on partially or fully dormant systems.

Eliminates the performance impact and other types of interference caused by the discovery activities on the running system.

Eliminates the need for user accounts and/or password(s) and circumvent procedures for satisfying access control on the running system (assuming the dormant version is unencrypted, or if encrypted, can be decrypted).

Reduce or eliminate need to access source environment, which may be difficult or impossible to access.

Address issues with damaged or corrupted media.

These and other features, aspects and advantages of the invention will become apparent from the following detailed description of illustrative embodiments thereof, which is to be read in connection with the accompanying drawings.

DETAILED DESCRIPTION OF PREFERRED EMBODIMENTS

As noted above, there are many IT optimization and management situations in which it is desirable or even necessary to obtain detailed inventory and dependency information from dormant computer systems. Current solutions only allow for obtaining superficial inventory from dormant computer systems, or detailed inventory from actively running computer systems, but not detailed inventory from dormant computer systems.

Figure 1:
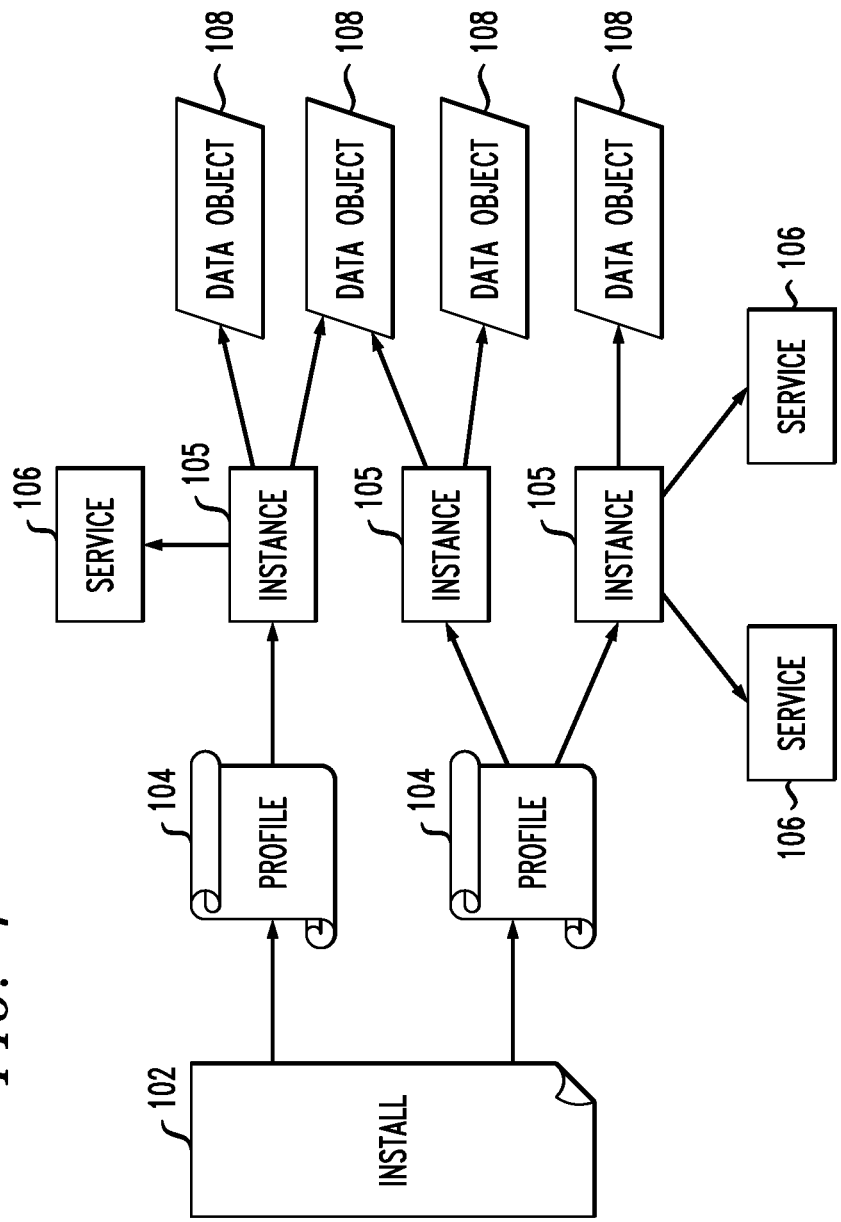
FIG. 1 shows an exemplary detailed inventory for a software installation.

Analysis and forensics capabilities on dormant systems are available as noted above; the utility of these techniques is generally limited to examining the files on those systems. However, they do not provide an automated way of obtaining detailed inventory information such as middleware, applications, and other software services, profiles, data objects, and the dependencies among them, as well as external dependencies. FIG. 1 shows an example of such detailed inventory for one software installation 102. Note profiles 104. The profiles are a set of parameters utilized in instances 105, which in turn access data objects 108. Instances 105 offer services 106.

One possible aspect is to output a model exactly like the result of an existing discovery tool for running images, as mentioned below, so that some follow-on tools already built for that model can be reused.

Automated discovery tools with detailed inventory capabilities exist today, e.g., IBM® Tivoli® Application Dependency Discovery Manager software (registered mark of International Business Machines Corporation, Armonk, N.Y., USA), which uncovers application dependencies and configurations; and the "Galapagos" system described in N. Joukov et al., "Built-to-Order Service Engineering for Enterprise IT Discovery," in Proceedings of IEEE International Conference on Services Computing (SCC 2008), Hawaii, vol. 2, pages 91-98, July 2008. Hypervisor-based virtual machine (VM) introspection techniques can also be used to analyze the state of running VMs, as known, for example, from G. W. Dunlap et al., ReVirt: enabling intrusion analysis through virtual-machine logging and replay, SIGOPS Oper. Syst. Rev. 36, SI (December 2002), 211-224; and L. Litty et al., "Hypervisor Support for Identifying Covertly Executing Binaries," In Proceedings of the 17$^{th}$ USENIX Security Symposium, Pages 243-258, July 2008. However, these technologies rely on obtaining information from running computer systems, and cannot obtain detailed inventory information directly from dormant systems. These technologies can be applied on a running computer system instantiated from the dormant system. However, there are important IT management and/or optimization situations where instantiating a running system from a dormant system is not possible or desirable. Some examples include:

Consider an IT migration scenario where a service delivery company is called in by a customer company (say, a banking firm) to migrate virtual machines from a source environment to a target environment. Snapshots of the IT systems in the source environment in the form of VM images may be provided to the service delivery company. The service delivery company may not have direct access to the source environment (e.g., it could be managed by another service delivery company), and re-creating the source environment may be cost-prohibitive. Detailed information about middleware, applications, and other software installations, services, profiles, data objects, and the dependencies among them as well as external dependencies may be required prior to creating a running VM in the target environment from the VM images. Such a priori information may be necessary to (i) ensure that the image satisfies certain properties prior to being admitted in the target environment, (ii) understand the right order in which VMs should be created in the target environment, and (iii) analyze potential changes that it may be desirable to make in the target environment. For this purpose, detailed analysis of the VM images would be required.

In some cases, one reason not to analyze the image in the source environment is to ensure that it is no longer changed during or after inspection. This is particularly important if the analysis is made for security or compliance reasons.

In the cloud context, VMs are often instantiated from pre-installed, pre-configured image templates that are activated with an amount of customization done through external scripts. These templates are sometimes called "golden images." These golden images contain software components common to many environments, and their purpose is reusability so that different environments can be instantiated from them with some customization. Often the golden images are named to indicate what the main software on them is (e.g., Apache Tomcat software or Oracle® software (registered mark of Oracle International Corporation, Redwood City, Calif. USA)), but the full list of software applications along with the version information may not be provided in their descriptions. In such cases, detailed analysis of the golden image files is necessary to identify what additional libraries, applications, and/or pieces of middleware need to be added to the golden image, which ones need to be deleted or modified, and how much customization is needed in order to create the desired VM image that will be deployed on the cloud.

An image has been "stashed away" and its source environment is no longer available. Even if started on a similar operating system, without certain connections, many applications will not come up at all, and others will not produce many runtime indications (such as processes and open connections) that can be assumed in normal discovery on images running in their steady-state environment.

An image or CD is slightly corrupted, so it will not start as a whole.

If all configurations, updates, and installations ever made on a computer system were properly documented, that would obviate the need for having automated detailed inventory capabilities in the above situations. In reality, however, such documentation is rarely if ever done. Even if it is done initially, the documentation does not keep pace with actual changes made to the IT infrastructure, and hence the documentation gets outdated.

Figure 3:
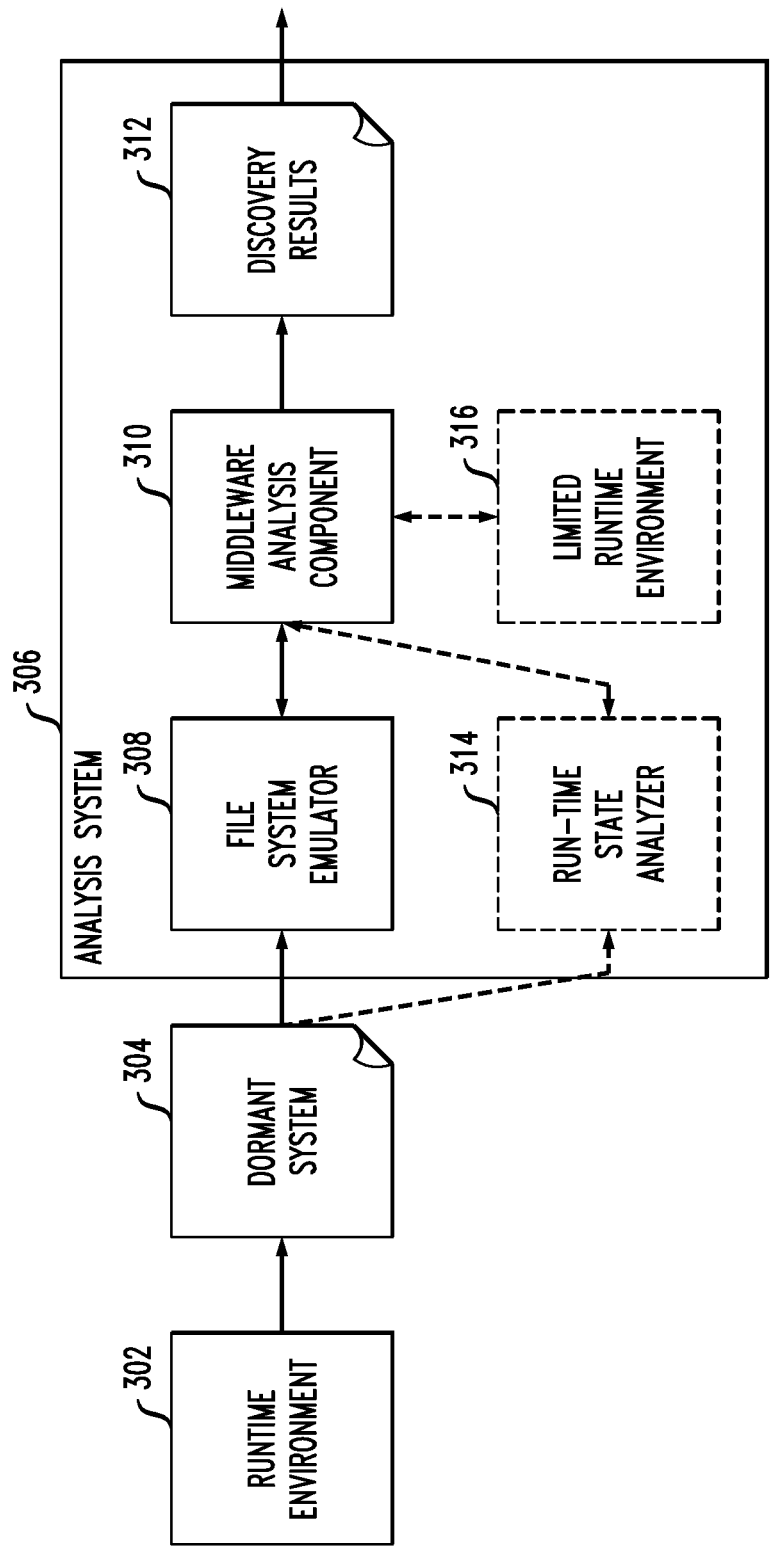
FIG. 3 shows an exemplary flow chart which also serves as an exemplary system block diagram.

With reference to FIG. 3, in a non-limiting exemplary embodiment, a method, according to an aspect of the invention, includes the step of simulating a file system interface out of the dormant system 304 or portions of the dormant system 304; the component doing this is referred to as a file system emulator 308 For example, in the context of VMWare® virtual machine images (registered mark of VMWare, Inc. Palo Alto, Calif. USA), utilities such as the VMWare Disk Mount Utility can be used to simulate a file system interface without actually instantiating the VM. Similarly, the QEMU™ (QEMU is a trademark of Fabrice Bellard) disk format, used by the XEN and KVM hypervisors can be mounted directly within Linux. Another example is the "Mirage" system as described in D. Reimer et al., "Opening Black Boxes: Using Semantic Information to Combat Virtual Machine Image Sprawl," Proc. 2008 ACM International Conference on Virtual Execution Environments (VEE 2008), 111-120. In addition to disk images, VM memory state, BIOS (basic input/output system) state, and other states can all be represented by files (however, they are not available for all images).

An additional step includes performing discovery using the above file system emulator 308 (which is part of analysis system 306); the component doing this is referred to herein as a middleware analysis component 310 Where configuration information would typically (i.e., in discovery tools for running systems) be obtained by executing commands, the middleware analysis component 310 identifies the data structures and files leveraged by those commands, and obtains that information directly by reading and interpreting those files. The commands may be at the operating system (OS) level, application level, or middleware level. They differ for different operating systems, applications, and middleware. Hence, the process of identification and obtaining the relevant information is specific to the particular OS, application, and middleware, and its details are significant aspects of one or more embodiments of the invention. For example, without a running system, the same utilities cannot be used to determine what operating system it ran or what its hostname is. However, by examining the file system, what operating system is running can be determined by which kernel is installed into the file system, and items such as hostname, can be discovered by parsing configuration and log files.

In a further step, if stored run-time state is available (e.g., virtual machine memory state), a run-time state analyzer 314 may be used to parse and analyze the state to obtain information about running processes (such as their CPU utilization and open port information) at the instant when the system was last alive.

In an optional step, the middleware analysis component 310 creates a limited run-time environment 316 for individual software components based on the file system interface. This limited runtime environment 316 is different from the original runtime environment 302 which is not available for the dormant system 304. It belongs to the analysis system 306, but may be distributed over multiple computers.

One potential advantage of one or more embodiments of the invention is provision of automated, detailed inventory and dependency analysis capabilities directly on partially or fully dormant systems. Previously known solutions that have such detailed analysis capabilities can only analyze active and running systems. Those solutions that can analyze dormant systems only obtain superficial inventory information.

The function of components 308 and 310 has been explained in the previous paragraphs; the discovery results are depicted in block 312.

Even in situations in which discovery can be performed on active and running systems, the alternative method of creating a dormant version of the system (e.g., a VM snapshot) and performing discovery directly on that version through one or more embodiments of the invention has the following advantages:

Eliminate the performance impact and other types of interference caused by the discovery activities on the running system.

Eliminate the need for user accounts and/or password(s) and circumvent procedures for satisfying access control on the running system (assuming the dormant version is unencrypted, or if encrypted, can be decrypted).

Figure 2:
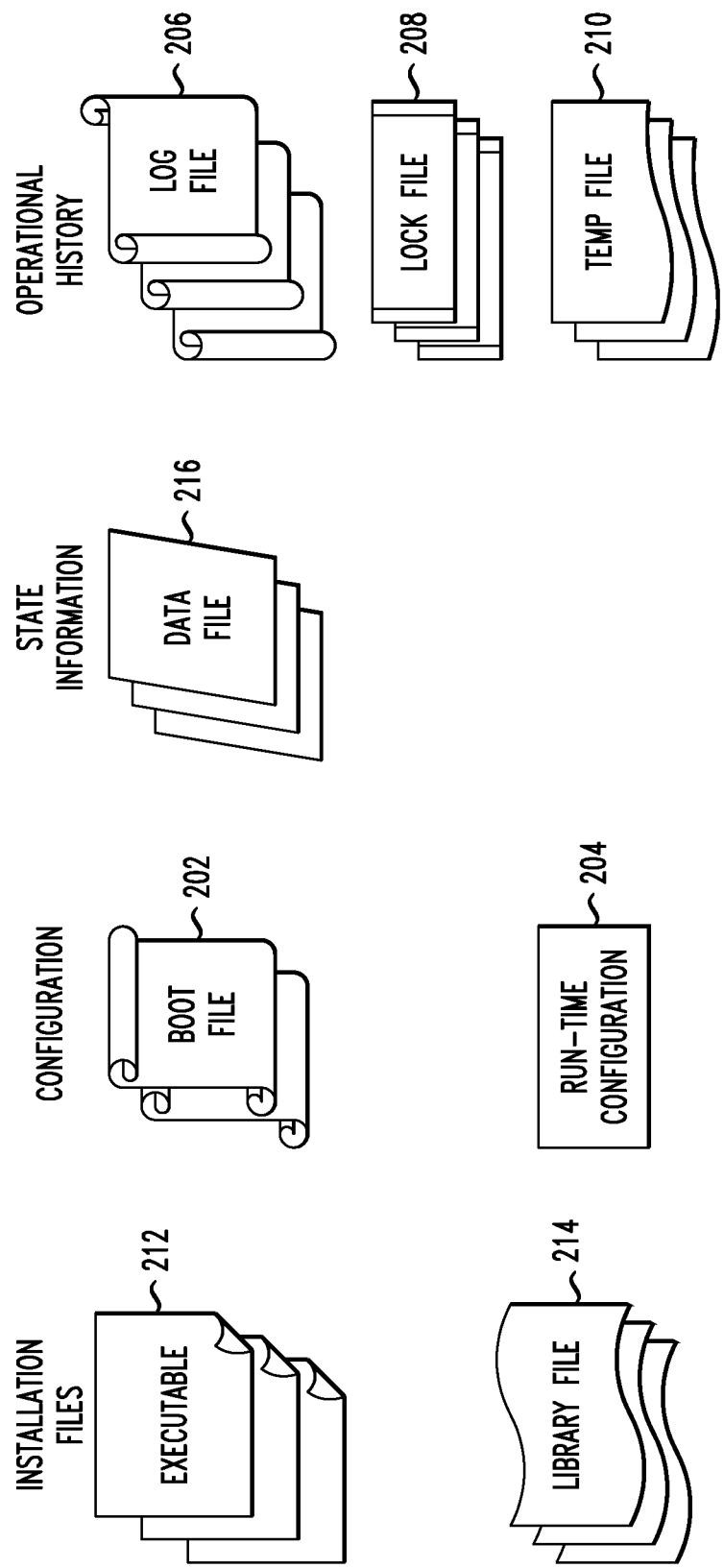
FIG. 2 shows multiple types of files considered in obtaining inventory from a dormant system.

In order to obtain detailed inventory, multiple types of files in the dormant system should be considered, as shown in FIG. 2. For a given software component, the analysis may include one or more of the following file types:

1) installed software, e.g., executable files 212 or libraries 214, as shown under "installation files";
2) configuration files such as boot files 202 and run-time configuration files 204 (there can be multiple sets of configuration files for each installation, each corresponding to a different profile 104 in FIG. 1);
3) data files 216 that hold software-specific data such as files holding database tables or static web pages, as shown under "state information"; and
4) log files 206, lock files 208, and other temporary files 210 that software components produce during their operation, as shown under "operational history."

This is also true for the operating system, e.g., a list of installed software is a data file of the operating system, and a process table is a temporary file. Some such files of the operating system play special roles in discovering many other types of software.

As part of obtaining detailed inventory of a dormant system, it may be of interest to discover the connectivity within the elements of a particular software component, as well as its connectivity with other software components. The contents of the above files may have to be correlated to obtain information such as the port number used for a service created from a particular profile of the installed software. In addition, the content of such files may point to or reference other software components. For example, a log file of an http (hypertext transfer protocol) server can point to the location of data files being fetched. A configuration file used in IBM WEBSPHERE® software (registered mark of International Business Machines Corporation, Armonk, N.Y., USA) may indicate databases used. Files at the operating-system level may point to other software components. For example, the database of a package management system, such as the RPM Package Manager package management system (available from Red Hat, Inc. Raleigh, N.C., USA), contains lists of software installed on the system, and helps to initiate detailed discovery of these individual software installations and deeper components as shown in FIG. 1.

Non-limiting exemplary details will now be provided with respect to finding software components from the interface provided by the file system emulator, using middleware analysis component 310. In at least some instances, software components may be found based on file signatures. Many types of files corresponding to software components have characteristic names and content that can be matched against a database of signatures to identify sets of files as particular software installations, configuration files, data files, log files, and the like. For middleware installations (i.e., the least fine-grained middleware classification from FIG. 1), this is state of the art and used, for example, in IBM Common Inventory Technology (CIT) software, available as part of products such as IBM Tivoli® License Compliance Manager software and IBM Tivoli® Provisioning Manager software (even though it is used as an agent-based technique on running systems in this context) (registered marks of International Business Machines Corporation, Armonk, N.Y., USA). In some embodiments, also apply this technique to files of finer-grained software components.

There are several ways for the middleware analysis component 310 to obtain software configuration details from a non-running software instance, once it has been found by any method such as those described above; for example:

a) Parse software configuration, data, or log files directly where this is easy, e.g., for xml (extensible markup language) or text-based files; the files are obtained from the file system emulator 308.

b) Set up a limited running environment 316 (without a fully running system) expected by software and start middleware instances just to perform the discovery. For example, start an actual WebSphere® application server, but no applications would be started, and it would have no connections to databases, no incoming connections from its web front end, and so on. This requires a library of machines in the analysis system 306 to host the running environment that correspond to all dormant instances it is desired to enable to run. For instance, at minimum, an individual machine would be needed for each architecture and operating system combination that is supported for this form of discovery. Without this, programs located on the dormant system will not be able to execute due to operating system and architecture requirements. This involves determining the operating system and architecture type of the dormant system, and selecting an appropriate system from the machines in the library to provide the limited runtime environment.

c) Set up environment variables like PATH and call middleware commands from the off-line disk image (via the file system emulator 308) even if the main middleware is not running (e.g., the "db2ilist" command for IBM DB2® database software (registered mark of International Business Machines Corporation, Armonk, N.Y., USA) can be called without starting a database instance). For example, each DB2 installation has its own set of utility programs associated with it. Once each installation instance is discovered, the PATH environment variable will be configured for that instance so the appropriate utility program will be executed. This can depend on the library of machines as described in b) if the utility programs are binaries that require a specific operating system and architecture combination. Note that element 306 can contain other physical or virtual systems with a set of OS/architectures that can be used to run operating system- and/or architecture-specific command(s).

d) Parse binary configuration files with middleware-specific utilities, if available, e.g., IBM WebSphere® MQ software (mark of International Business Machines Corporation, Armonk, N.Y., USA) and IBM DB2® software have such utilities available. That is, here use utilities installed separately on the analysis system, while in item c) utilities were called from the dormant image.

Each of the ways (a) to (d) above may, among other things, discover dependencies to additional software components, and then ways (a) to (d) may be used to analyze those additional software components as well, if this has not been done before.

In at least some instances, it may be difficult to identify what installations, profiles, and services would actually be active if the system were run again, without having access to a running system or a suspended state of the running system. This issue can be addressed by:

a) Examining log files mentioned in the configuration files. For example, on newer versions of the Apache HTTPd server used in a default manner, the location of its configuration files can be determined via strings located within the binary. However, if the program is not used in a default manner, due to the use of command line parameters, well known log files can be parsed to determine how Apache was executed and where its configuration files are located.

b) Analyzing and comparing metadata associated with each configuration and data file on the dormant system's file system. For instance, each time a file is accessed or written to, the accessed and modified time stamps are updated respectively. For example on older versions of the Apache HTTPd server that do not log what command line options are passed to it, configuration files and different Apache HTTPd instances can be correlated based on their last access times.

The complete disclosure of co-assigned U.S. patent application Ser. No. 12/550,023 of Nikolai Joukov and Norbert Vogl, entitled "Middleware-Driven Server Discovery," filed Feb. 9, 2010, is expressly incorporated herein by reference in its entirety for all purposes.

Thus, one or more embodiments provide a method for obtaining detailed inventory from dormant computer systems, including the steps of simulating a file system interface out of the dormant system; and performing file-based discovery using that interface, where the inventory may include software profiles, instances, services, data objects used by them, and dependencies to other software. In some instances, a limited run-time environment for individual software components is created from the dormant system for the purpose of detailed inventory. Preferably, files and file attributes are used to identify active software services without having access to a running system or a suspended state of the running system.

Given the discussion thus far, it will be appreciated that, in general terms, a method, according to an aspect of the invention, includes the step of simulating a file system interface out of at least a portion of a dormant computer system 304; for example, using file system emulator 308. The method further includes performing file-based discovery on the simulated file system interface to obtain a detailed inventory of at least the portion of the dormant computer system; for example, using middleware analysis component 310. The detailed inventory includes one or more of software profiles 104 of at least the portion of the dormant computer system, software instances 105 of at least the portion of the dormant computer system, services 106 of at least the portion of the dormant computer system, and data objects 108 used by the services 106.

The portion of the dormant computer system for which the detailed inventory is obtained could be smaller than the part that is simulated. For example, the file system emulator could be a general component like the VMWare Disk Mount Utility which emulates the entire file system. There may only be interest in those parts of the file system that represent software installations. Typically, these are searched for throughout the file system.

In at least some instances, in the performing step, the detailed inventory further comprises dependencies of any one, some, or all of profiles, instances, services and/or data objects to other software.

In at least some embodiments, an additional step includes creating a limited run time environment 316 for select software components, from at least the portion of the dormant computer system, based on the simulated file system interface. Note that in one or more embodiments, the components include primarily instances, because the instances are the components that run. Once there is an instance, one or more of its services and data objects might also get started. For the avoidance of doubt, note that a "data object" can also be an application module, when the "instance" is an application server, so indeed that object can contain code and be started, but not alone. Furthermore, another additional step in such embodiments can include starting at least one middleware instance within the limited run time environment 316, typically but not necessarily without any associated applications or connections. The performing step can, in such embodiments, be further carried out on the at least one middleware instance. In one or more embodiments, the goal of starting the middleware instances is to execute a command on them, so this specific discovery part isn't very "file-based"; in such cases, the performing step further carried out on the at least one middleware instance is not necessarily "file-based." This should be understood throughout the application, including the claims, whether or not explicitly stated.

In at least some cases, the file system emulator 308 includes access to files and file attributes, and/or the performing step is carried out without access to a running system (in some cases, possibly without access to a suspended state of the running system). The files and file attributes would likely almost always be available, also in the cases where the performing step does have access to a suspended state of a runtime system. Access to the original runtime environment 302 is unlikely, although some of its suspended states might be present in 304, or a limited runtime environment 316 might be brought up inside 310.

By way of example and not limitation, at least the portion of the dormant computer system may be a virtual machine image, and the performing step can be carried out, in at least some cases, without instantiating the virtual machine.

The dormant system 304 may include, for example, files representing disk images, virtual machine memory states, and/or basic input-output system states. The file system emulator 308 typically analyzes these overall files such as a disk image so that the analysis component can access the individual files that were available on the original runtime environment 302 and that are now encoded in the disk image. A virtual machine memory state and/or basic input-output system state may be analyzed by a run-time state analyzer 314 that converts image-specific memory dumps to a readable state for the middleware analysis component 310.

In some embodiments, an additional step includes identifying files leveraged by select commands, in which case the performing step further includes reading and interpreting the files leveraged by the select commands to obtain configuration information associated with execution of the select commands. The select commands may reside, for example, at an operating system level, an application level, and/or a middleware level. It is worth noting that component 310 is referred to as a "middleware analysis component," but in at least some embodiments, may also address applications and/or operating system-level software.

In a case where at least one stored run-time state is available, the performing step may further include parsing and analyzing the at least one stored run-time state to obtain information about processes which were running during a last alive instant of the dormant computer system (i.e., the last available stored run time state prior to the system becoming dormant). The at least one stored run-time state parsed and analyzed in the performing step may be, by way of example and not limitation, a virtual machine memory state. One use of the information about processes is to help identification of instances. Processes are the most common but not the only example of what can be obtained from the stored run time state (for example, open connections and the like might also be obtained).

As seen in FIG. 2, the simulated file system interface may include, for example, installed software files 212, 214; configuration files 202, 204; software-specific data files 216; and temporary files produced by software components during operation (e.g., 206, 208, 210). In at least some cases, if there is a file system emulator, it will automatically give an interface to all files, without knowing or caring what they are; the analysis component 310 specifically analyzes one or more of these file types for each piece of software.

In some cases, the performing step includes matching names and content in the simulated file system against a database of software signatures to identify at least portions of the simulated file system as representative of particular software installations of the dormant computer system to be included in the detailed inventory. The performing step may include directly parsing at least one of configuration files, data files, and log files, and/or parsing binary configuration files with a middleware-specific utility. The performing step may also include setting up at least one environment variable associated with at least one middleware program, and calling middleware commands from an off-line disk image of the at least one middleware program without running the at least one middleware program.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
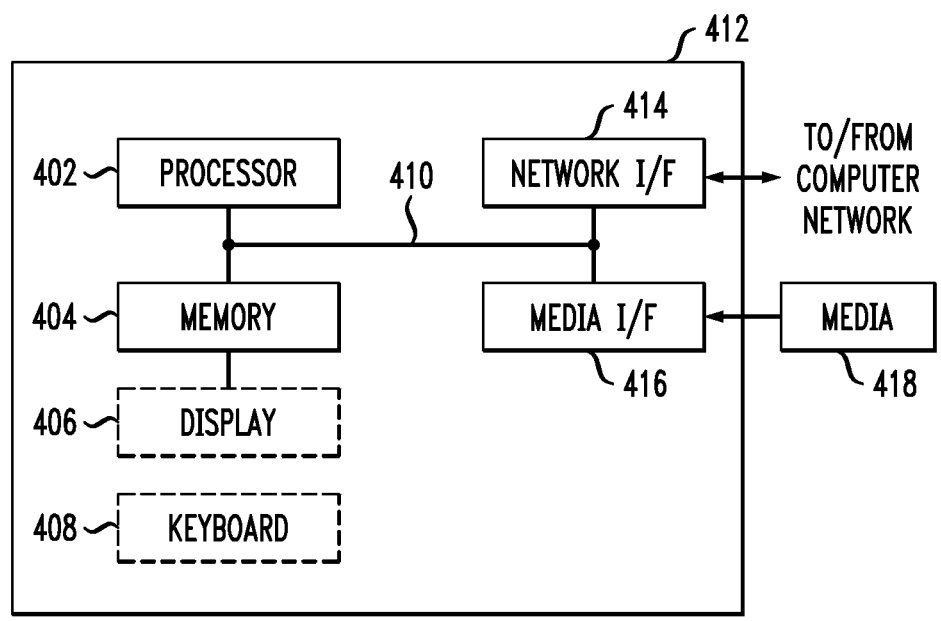
FIG. 4 depicts a computer system that may be useful in implementing one or more aspects and/or elements of the invention.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. One or more embodiments preferably employ a scripting language such as Perl. Furthermore, in addition to object oriented and procedural languages, some embodiments might employ functional languages (e.g., Lisp, ML) and/or logical languages (e.g., Prolog). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). For example, the user of the analysis system 306 could be directly working with that system, or remotely access it. Furthermore, elements 308 and 310 could be on the same or different computers. In addition, information regarding the dormant system may be given to the analysis system on any kind of medium.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagram(s) in the Figures illustrate the architecture, functionality, and operation of possible implementations of systems, methods and computer program products according to various embodiments of the present invention. In this regard, in general, each block in the flowchart or block diagrams may represent a module, segment, or portion of code, which comprises one or more executable instructions for implementing the specified logical function(s) (although it should be noted that block 312 represents results and that while a dormant image is full of code, the dormant image itself is typically not run in one or more embodiments). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Note that modules 308 and 310 are depicted and described in a preferred order of operation. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagram of FIG. 3; by way of example and not limitation, a file system emulator module and a middleware analysis module. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    simulating a file system interface out of at least a portion of a dormant computer system;
    performing file-based discovery on said simulated file system interface to obtain a detailed inventory of said dormant computer system, said detailed inventory comprising at least one of:
        software profiles of said dormant computer system,
        software instances of said dormant computer system,
        services of said dormant computer system, and
        data objects used by said services; and
    identifying files leveraged by select commands, wherein said performing step further comprises reading and interpreting said files leveraged by said select commands to obtain configuration information associated with execution of said select commands;
    creating a limited run time environment for select ones of said software instances, from at least said portion of said dormant computer system, based on said simulated file system interface; and
    starting at least one middleware instance within said limited run time environment;
    wherein said performing step is further carried out on said at least one middleware instance.

2. The method of claim 1, wherein in said performing step, said detailed inventory further comprises dependencies to other software.

3. The method of claim 1, wherein said simulated file system interface comprises access to files and file attributes, and wherein said performing step is carried out without access to a running system.

4. The method of claim 1, wherein said dormant computer system comprises a virtual machine image, and wherein said performing step is carried out without instantiating said virtual machine.

5. The method of claim 1, wherein said dormant computer system comprises files representing disk images, virtual machine memory states, and basic input-output system states.

6. The method of claim 1, wherein said select commands reside at at least one of an operating system level, an application level, and a middleware level.

7. The method of claim 1, wherein at least one stored run-time state is available, wherein said performing step further comprises parsing and analyzing said at least one stored run-time state to obtain information about processes which were running during a last alive instant of said dormant computer system.

8. The method of claim 7, wherein said at least one stored run-time state parsed and analyzed in said performing step comprises a virtual machine memory state.

9. The method of claim 1, wherein said simulated file system interface comprises installed software files, configuration files, software-specific data files, and temporary files produced by software components during operation.

10. The method of claim 1, wherein said performing step comprises matching names and content in said simulated file system against a database of software signatures to identify at least portions of said simulated file system as representative of particular software installations of said dormant computer system to be included in said detailed inventory.

11. The method of claim 1, wherein said performing step comprises directly parsing at least one of configuration files, data files, and log files.

12. The method of claim 1, wherein said performing step comprises parsing binary configuration files with a middleware-specific utility.

13. The method of claim 1, wherein said performing step comprises:
    setting up at least one environment variable associated with at least one middleware program; and
    calling middleware commands from an off-line disk image of said at least one middleware program without running said at least one middleware program.

14. The method of claim 1, further comprising providing a system, wherein said system comprises distinct software modules, each of said distinct software modules being embodied on a computer-readable storage medium, and wherein said distinct software modules comprise a file system emulator module and a middleware analysis module;
    wherein:
    said simulating step is carried out by said file system emulator module executing on at least one hardware processor; and said performing step is carried out by said middleware analysis module executing on said at least one hardware processor.

15. A computer program product comprising a non-transitory computer readable storage medium having computer readable program code embodied therewith, said computer readable program code comprising:
computer readable program code configured to simulate a file system interface out of at least a portion of a dormant computer system;
computer readable program code configured to perform file-based discovery on said simulated file system interface to obtain a detailed inventory of said dormant computer system, said detailed inventory comprising at least one of:
software profiles of said dormant computer system,
software instances of said dormant computer system,
services of said dormant computer system, and
data objects used by said services; and
computer readable program code configured to identify files leveraged by select commands, wherein said computer readable program code configured to perform file-based discovery further comprises computer readable program code configured to read and interpret said files leveraged by said select commands to obtain configuration information associated with execution of said select commands;
computer readable program code configured to create a limited run time environment for select ones of said software instances, from at least said portion of said dormant computer system, based on said simulated file system interface; and
computer readable program code configured to start at least one middleware instance within said limited run time environment;
wherein said computer readable program code configured to perform file-based discovery further acts on said at least one middleware instance.

16. The computer program product of claim 15, wherein in said computer readable program code configured to perform file-based discovery, said detailed inventory further comprises dependencies to other software.

17. An apparatus comprising:
a memory; and
at least one processor, coupled to said memory, and operative to:
simulate a file system interface out of at least a portion of a dormant computer system;
perform file-based discovery on said simulated file system interface to obtain a detailed inventory of said dormant computer system, said detailed inventory comprising at least one of:
software profiles of said dormant computer system,
software instances of said dormant computer system,
services of said dormant computer system, and
data objects used by said services; and
identify files leveraged by select commands, wherein said at least one processor is operative to perform said file-based discovery by reading and interpreting said files leveraged by said select commands to obtain configuration information associated with execution of said select commands;
create a limited run time environment for select ones of said software instances, from at least said portion of said dormant computer system, based on said simulated file system interface;
start at least one middleware instance within said limited run time environment; and
perform discovery on said at least one middleware instance.

18. The apparatus of claim 17, wherein said at least one processor is operative to perform said file-based discovery to obtain in said detailed inventory dependencies to other software.

19. The apparatus of claim 17, wherein
said discovery performed on said at least one middleware instance not necessarily being file based.

20. The apparatus of claim 17, further comprising a plurality of distinct software modules, each of the distinct software modules being embodied on a computer-readable storage medium, and wherein the distinct software modules comprise a file system emulator module and a middleware analysis module;
wherein:
said at least one processor is operative to simulate said file system interface by executing said file system emulator module; and
said at least one processor is operative to perform said file-based discovery by executing said middleware analysis module.

21. An apparatus comprising:
means for simulating a file system interface out of at least a portion of a dormant computer system;
means for performing file-based discovery on said simulated file system interface to obtain a detailed inventory of said dormant computer system, said detailed inventory comprising at least one of:
software profiles of said dormant computer system,
software instances of said dormant computer system,
services of said dormant computer system, and
data objects used by said services; and
means for identifying files leveraged by select commands, wherein said means for performing further comprises means for reading and interpreting said files leveraged by said select commands to obtain configuration information associated with execution of said select commands;
means for creating a limited run time environment for select ones of said software instances, from at least said portion of said dormant computer system, based on said simulated file system interface; and
means for starting at least one middleware instance within said limited run time environment;
wherein said means for performing carries out said file-based discovery on said at least one middleware instance.

* * * * *